(12) United States Patent
Franklin

(10) Patent No.: US 7,679,533 B2
(45) Date of Patent: Mar. 16, 2010

(54) PHOTODIODE ARRAY FOR AN OPTICAL ENCODER, PHOTODIODE DETECTION SYSTEM, AND OPTICAL ENCODER

(75) Inventor: Ruth E. Franklin, Santa Barbara, CA (US)

(73) Assignee: Renco Encoders Inc., Goleta, CA (US)

( * ) Notice: Subject to any disclaimer, the term of this patent is extended or adjusted under 35 U.S.C. 154(b) by 0 days.

(21) Appl. No.: 11/866,285

(22) Filed: Oct. 2, 2007

(65) Prior Publication Data

US 2009/0084945 A1    Apr. 2, 2009

(51) Int. Cl.
*H03M 1/22* (2006.01)

(52) U.S. Cl. ................ 341/13; 250/231.13; 250/231.18

(58) Field of Classification Search .................... 341/13; 250/231.13–231.18
See application file for complete search history.

(56) References Cited

U.S. PATENT DOCUMENTS

| 6,528,783 | B1 * | 3/2003 | Mortara et al. ......... 250/231.13 |
| 7,324,212 | B2 * | 1/2008 | Mitchell et al. ............. 356/499 |
| 2008/0061771 | A1 * | 3/2008 | Sugiyama et al. ...... 324/207.25 |

FOREIGN PATENT DOCUMENTS

| GB | 2 352 810 | 2/2001 |
| JP | 6-26885 | 2/1994 |
| JP | 2006-308358 | 11/2006 |
| WO | WO 2006/006605 | 1/2006 |

* cited by examiner

*Primary Examiner*—Jean B Jeanglaude
(74) *Attorney, Agent, or Firm*—Kenyon & Kenyon LLP

(57) ABSTRACT

A photodiode detector array for an optical encoder includes a sequence of photodiodes having a pitch between adjacent photodiodes that alternates between a first pitch and a second pitch, the second pitch being different than the first pitch.

31 Claims, 5 Drawing Sheets

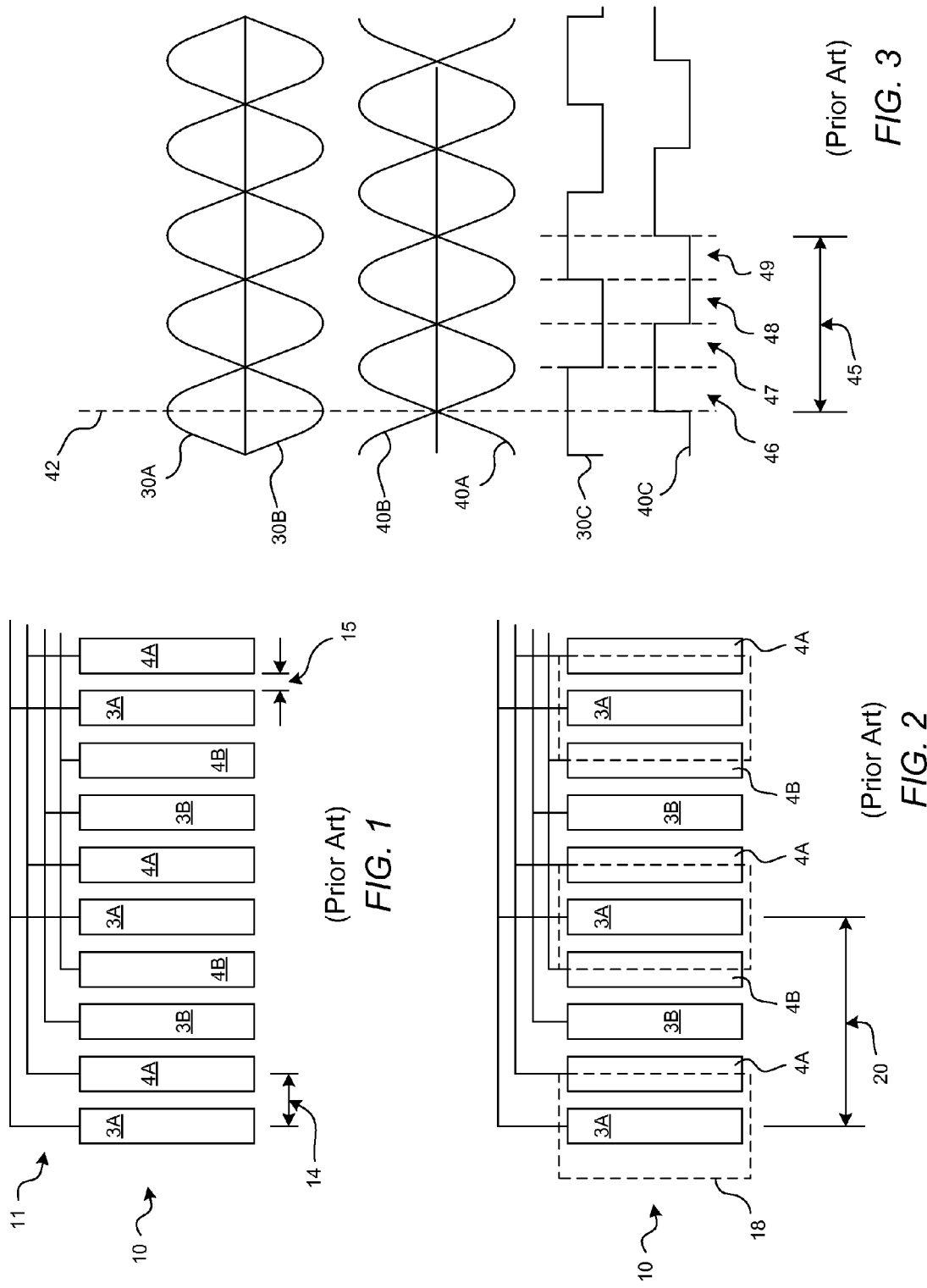

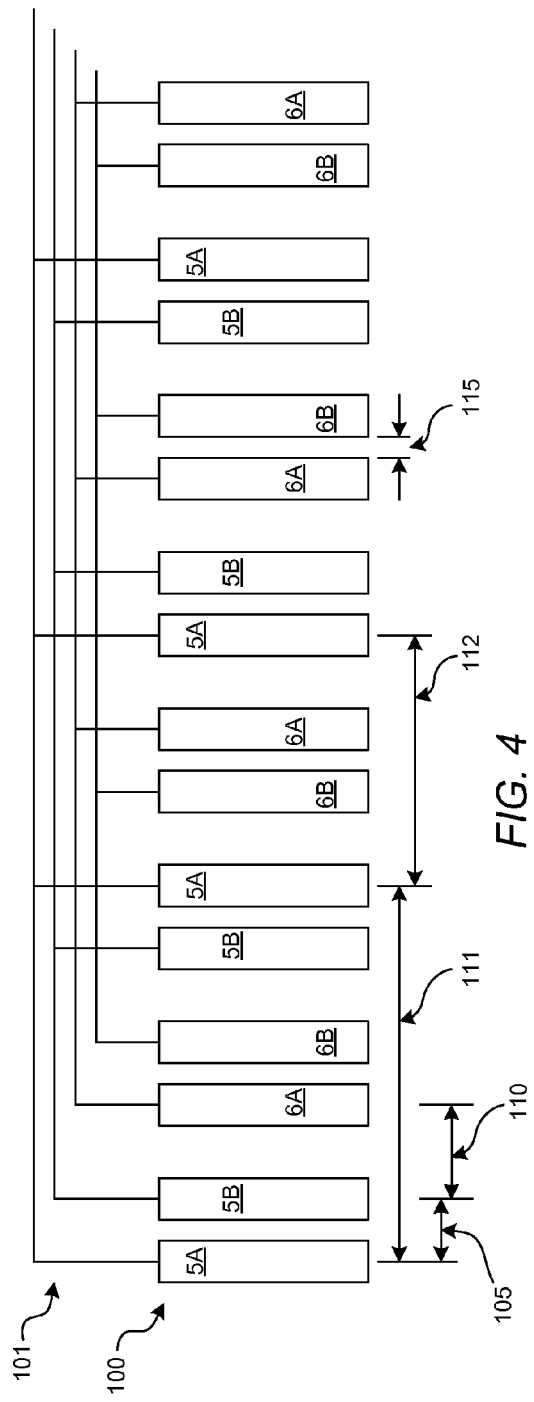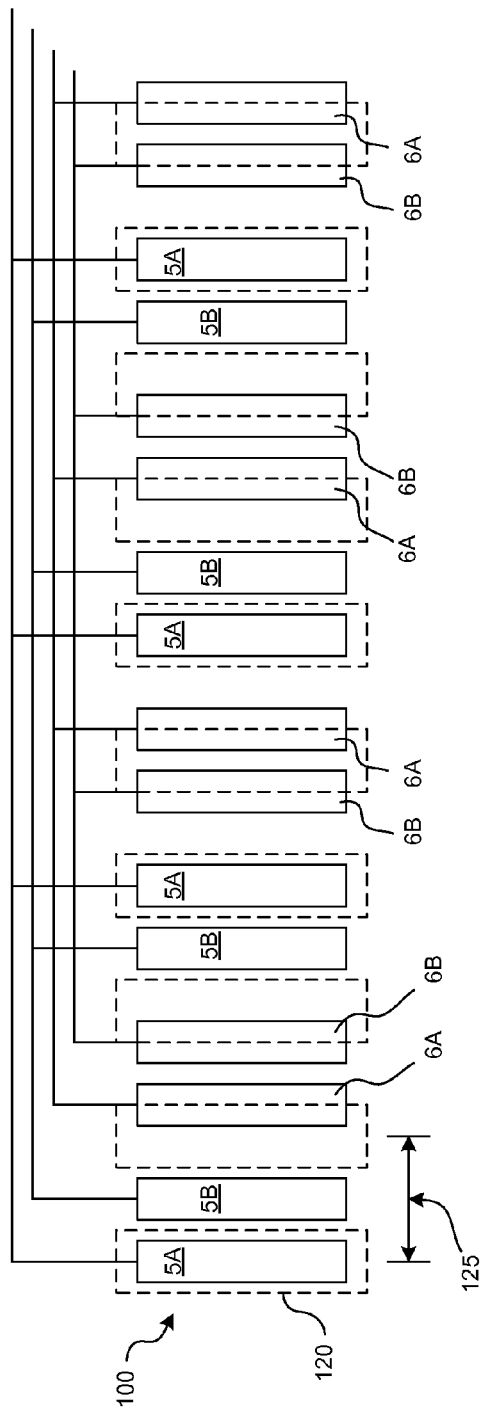

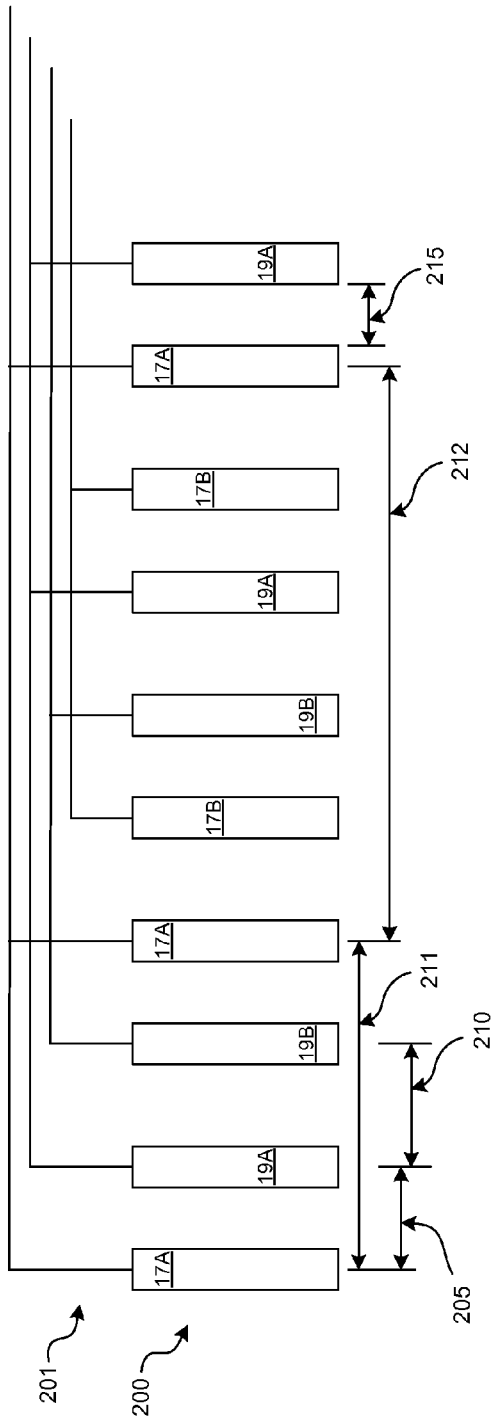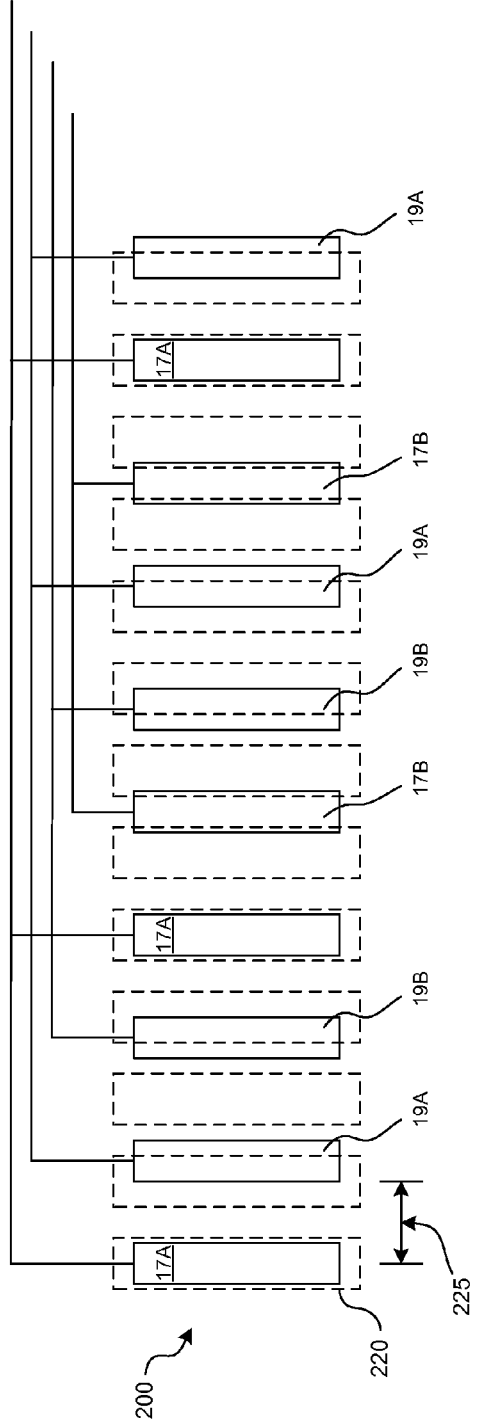

US 7,679,533 B2

PHOTODIODE ARRAY FOR AN OPTICAL ENCODER, PHOTODIODE DETECTION SYSTEM, AND OPTICAL ENCODER

FIELD OF THE INVENTION

The present invention relates to a photodiode array for an optical encoder, a photodiode detection system as well as an optical encoder.

BACKGROUND INFORMATION

Encoders are used to measure angular or linear displacement. Optical encoders include photodiode arrays arranged in a detection plane for detecting incremental signals indicative of relative movement, e.g., rotary or linear movement, of encoder parts. Optical encoders include a light source, a scale index member (such as, e.g., a slotted or graduated code disk), and an array of photodiodes. A graduated code disk includes alternating transparent and opaque areas arranged periodically in a defined, fixed code disk pitch. In rotary encoders, the code disk is typically coupled to a rotating shaft and moved relative to the light source and the photodiode array.

Light is directed from the light source to the photodiode array by the scale index member or code disk. As the code disk rotates, in the case of an angular encoder, or moves linearly, in the case of a linear encoder, output signals from the photodiode array change. These varying output signals are used to measure angular or linear displacement.

An encoder's resolution refers to how sensitive the encoder is to displacement and depends on the amount of displacement between discrete measurement points. An encoder with a higher resolution allows more precise displacement measurement than encoders with lower resolutions. Increasing resolution may be complicated by manufacturing limitations, such as, e.g., a minimum width of the individual photodiodes and a minimum distance between adjacent, i.e., immediately adjacent, photodiodes. For example, under certain manufacturing constraints, it may not be possible to manufacture diodes having a pitch below, e.g., 9 μm U.K. Published Patent Application 2 353 810 relates to a displacement measuring apparatus. To accommodate more closely packed photodiodes—and thus increase resolution—the photodiodes are deposited onto a substrate in two or more separate layers with adjacent photodiodes being deposited in different layers. This process may allow adjacent photodiodes to be more closely spaced than if the photodiodes were all deposited in the same layer. However, manufacture of such an apparatus requires complex sensor fabrication techniques, additional layers and interconnects, thereby resulting in increased manufacturing costs.

SUMMARY

According to an example embodiment of the present invention, a photodiode detector array for an optical encoder includes: a sequence of photodiodes having a pitch between adjacent, i.e., immediately adjacent, photodiodes that alternates between a first pitch and a second pitch, the second pitch being different than the first pitch.

The following equation may be satisfied:

second pitch=first pitch*$((3+4i)/(2+4i))$, i representing an integer greater than or equal to 0.

The second pitch may be 1.5 times the first pitch.
The following equation may be satisfied:

second pitch=first pitch*$((2+4i)/(1+4i))$, i representing an integer greater than or equal to 0.

The second pitch may be 1.2 times the first pitch.

The photodiode array may include a plurality of channels, and each channel may include a first complementary photodiode and a second complementary photodiode.

Each of the first complementary photodiode and the second complementary diode may repeat with a third pitch, and the third pitch may (a) alternate between 4 times the first pitch and 6 times the first pitch, (b) alternate between 5⅓ times the first pitch and 3⅓ times the first pitch, or (b) alternate between 5.6 times the first pitch and 3.2 times the first pitch.

According to an example embodiment of the present invention, a photodiode detector system for an optical encoder may include: a photodiode detector array having a sequence of photodiodes having a pitch between adjacent, i.e., immediately adjacent, photodiodes that alternates between a first pitch and a second pitch, the second pitch being greater than the first pitch; and a scale index member configured to direct light to the photodiodes.

The scale index member may be a code disk.

The scale index member may include slots having a slot pitch, and the slot pitch may be twice the first pitch.

The scale index member may include slots having a slot pitch, and the slot pitch may be ⅘ the first pitch.

It should be appreciated that the photodiode detector array of the photodiode detector system may have any one or more of the features of the photodiode detector array described herein.

According to an example embodiment of the present invention, an optical encoder includes: a light source; a photodiode detector array including a sequence of photodiodes having a pitch between adjacent photodiodes that alternates between a first pitch and a second pitch, the second pitch being greater than the first pitch; and a scale index member configured to direct light from the light source to the photodiodes.

It should be appreciated that the photodiode detector array of the optical encoder may have any one or more of the features of the photodiode detector array described herein.

Further details and aspects of example embodiments of the present invention are described in more detail below with reference to the appended Figures.

BRIEF DESCRIPTION OF THE DRAWINGS

FIG. 1 is a top view of a conventional photodiode detector array.

FIG. 2 is a top view of the photodiode array illustrated in FIG. 1, further illustrating the positions of slots of a scale index member according to the prior art.

FIG. 3 is a graphical view of analog and digitized output signals associated with the photodiode detector array of FIG. 1.

FIG. 4 is a top view of a photodiode detector array according to an exemplary embodiment of the present invention.

FIG. 5 is a top view of the photodiode detector array illustrated in FIG. 4, further illustrating the positions of slots of a scale index member.

FIG. 8 is a top view of a photodiode array according to an exemplary embodiment of the present invention.

FIG. 9 is a top view of the photodiode detector array illustrated in FIG. 8, further illustrating the positions of slots of a scale index member.

DETAILED DESCRIPTION

Figure 6:
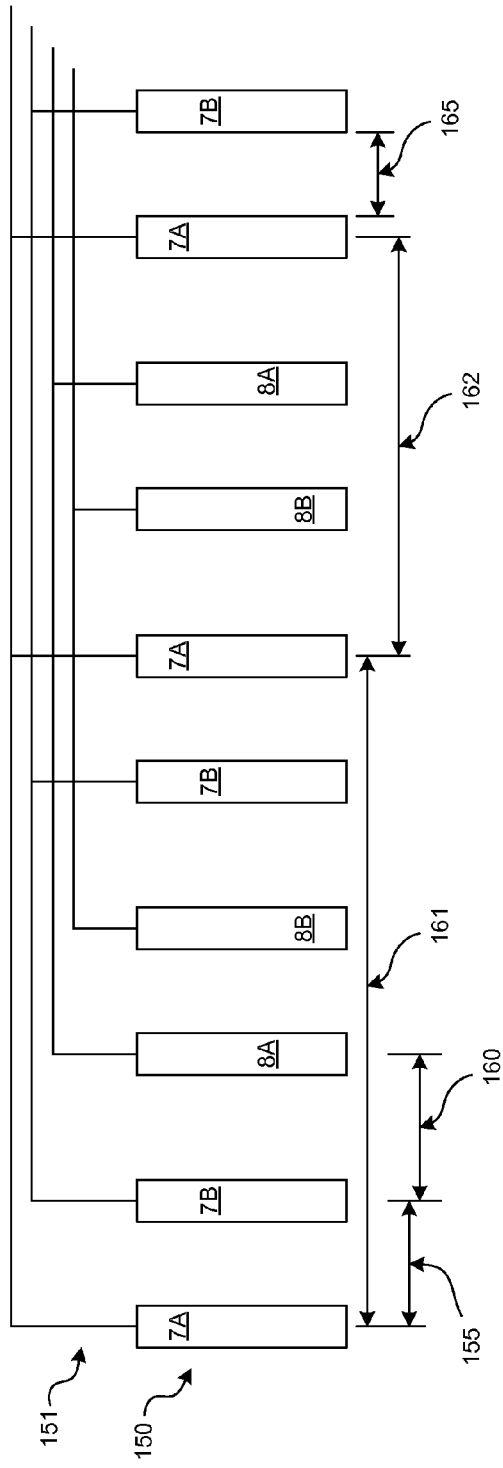
FIG. 6 is a top view of a photodiode array according to an exemplary embodiment of the present invention.

FIG. 1 is a top view of a conventional photodiode detector array 10. The photodiode detector array 10 includes a pattern of repeating segments of four photodiodes 3A, 4A, 3B, 4B. The photodiodes include two pairs of complementary photodiodes, the first pair including photodiodes 3A and 3B and the second pair including photodiodes 4A and 4B. An output arrangement 11 includes four discrete output signals, one for each of the four photodiodes 3A, 4A, 3B, 4B included in each repeating segment. Each output signal of a repeating segment is connected in series to corresponding output signals of other segments. The positions of photodiodes 3A, 4A, 3B, 4B are defined by a constant photodiode pitch 14 (center-to-center distance) between adjacent photodiodes. That is, the distance between each adjacent pair of photodiodes is the same. Between each adjacent photodiode is a gap 15.

FIG. 2 is a top view of the photodiode array 10 illustrated in FIG. 1, further illustrating the scale of the code disk. In FIG. 2, the scale is indicated by slots 18. These slots 18 may be, e.g., openings in the code disk, alternating opaque/transparent areas of the code disk, alternating reflective/non-reflective areas of the code disk, etc. The slots direct light from a light source to the photodiodes 3A, 4A, 3B, 4B. The slots 18 are positioned according to a code disk pitch 20, which, in this example, is constant and is four times the photodiode pitch 14. When the slots 18 are in the position indicated in FIG. 2, each slot 18 fully exposes each photodiode 3A to light from the light source, while photodiode 3B is unexposed, and photodiodes 4A and 4B are each approximately half exposed.

The position of the slots 18 as illustrated in FIG. 2 causes the photodiodes to generate output signals as illustrated in FIG. 3 at line 42. Signal 30A, the output signal from photodiodes 3A, is approximately at a maximum value, and signal 30B, the output signal from photodiodes 3B, is approximately at a minimum value. Signals 40A and 40B, the output signals from photodiodes 4A and 4B, respectively, are each approximately at a value halfway between a maximum value and a minimum value. In the example illustrated, the signals 30A, 30B, 40A, 40B are sinusoidal. Thus, at line 42, signal 30A is at a maximum positive value, signal 30B is at a maximum negative value, and each of signals 40A, 40B is at a zero value. These analog signals 30A, 30B, 40A, 40B are converted to digital channels 30C and 40C. Channel 30C is at a high value when the value of signal 30A exceeds the value of signal 30B and at a low value when the value of signal 30B exceeds the value of signal 30A; and channel 40C is at a high value when the value of signal 40A exceeds the value of signal 40B and at a low value when the value of signal 40B exceeds the value of signal 40A. As the slots 18 are displaced in relation to the photodiode array 10 by a distance equal to the pitch 20, four discrete position signal combinations 46, 47, 48, 49 are successively generated. These combinations are: (a) channel 30C high/channel 40C high; (b) channel 30C low/channel 40C high; (c) channel 30C low/channel 40C low; and (d) channel 30C high/channel 40C low. Four adjacent combinations span a distance 45, which is, in this example, equal to the pitch 20 of the slots 18. In this regard, a higher or lower resolution refers to a greater number or a lesser number, respectively, of discrete signal combinations per unit of displacement.

The resolution of the photodiode array 10 illustrated in FIGS. 1 and 2 may—in theory—be increased indefinitely by reducing the width of the photodiodes 3A, 4A, 3B, 4B, the gap 15 between the photodiodes, and the pitch 20 between slots 18. However, the resolution of this array 10 is subject to real-world manufacturing limitations. For example, according to certain manufacturing techniques, the minimum pitch 14 achievable between adjacent photodiodes may be, e.g., 9.0 µm, and the minimum gap 15 between adjacent photodiodes may be, e.g., 5.0 µm.

Example embodiments of the present invention provide for a photodiode array having a virtual diode pitch that is less than the actual minimum pitch manufacturable by the manufacturing process. Thus, for example, while the manufacturing technique may only allow for a minimum photodiode pitch of, e.g., 9 µm, a photodiode array according to example embodiments of the present invention may provide for a virtual diode pitch of, e.g., 4.5 µm. That is, example embodiments of the present invention provide for greater resolution as compared with conventional devices.

FIG. 4 is a top view of a photodiode detector array 100 according to an exemplary embodiment of the present invention. The photodiode detector array 100 includes a pattern of repeating segments of eight photodiodes, each segment having the following pattern: 5A, 5B, 6A, 6B, 5B, 5A, 6B, 6A. Within each segment, four pairs of complementary photodiodes, e.g., 5A-5B, 6A-6B, 5B-5A, and 6B-6A, each have a first pitch 105 and a gap 115 between complements, and a second pitch 110 between adjacent complementary pairs. In this example, the second pitch 110 is 1.5 times the first pitch 105. It should be appreciated, however, that any combination of pitches may be employed, such as according to the following equation:

$$\text{second pitch} = \text{first pitch} \ast ((3+4i)/(2+4i))$$

where i is an integer greater than or equal to 0. It is noted that the present example satisfies the foregoing equation with i=0. Like photodiodes are connected in series in output arrangement 101.

In the example photodiode detector array 100 illustrated in FIG. 4, each complementary photodiode 5A, 5B, 6A, 6B repeats with a pitch that alternates between six times the first pitch 105 and four times the first pitch 105. For example, photodiode 5A repeats with a pitch that alternates between a first distance 111 that is six times the first pitch 105 and a second distance 112 that is four times the first pitch 105.

FIG. 5 is a top view of the photodiode detector array 100 illustrated in FIG. 4, further illustrating the positions of slots 120 of a scale index member, e.g., a code disk. These slots 120 direct light from a light source to the photodiodes 5A, 5B, 6A, 6B. The slots 120 are positioned according to a constant slot pitch 125, which, in this example, is twice the first pitch 105. When the slots 120 are in the position indicated in FIG. 5, each photodiode 5A is fully exposed by the slots 120 to light from the light source, while photodiode 5B is substantially unexposed and photodiodes 6A and 6B are each approximately half exposed. The slots exposing photodiodes 5A are alternatingly spaced by distances equal to three and two times the slot pitch 125.

In comparison to the array 10 of FIGS. 1 and 2, if a minimum permissible gap 15, 115 and photodiode width are constant, a greater resolution is attainable with the photodiode detector array 100 depicted in FIGS. 4 and 5 than that illustrated in FIGS. 1 and 2, with the same slot pitch and the same minimum manufacturable pitch between adjacent photodiodes. For example, the array 100 illustrated in FIGS. 4 and 5 may have a virtual resolution of twice that of the array 10 illustrated in FIGS. 1 and 2.

FIG. 6 is a top view of a photodiode detector array 150 according to an exemplary embodiment of the present invention. The photodiode detector array 150 includes a pattern of repeating segments of eight photodiodes, each segment having the following pattern: 7A, 7B, 8A, 8B, 7B, 7A, 8B, 8A. Within each segment, four pairs of complementary photodiodes, e.g., 7A-7B, 8A-8B, 7B-7A, and 8B-8A, each have a first pitch 155 and a gap 165 between complements, and a second pitch 160 between adjacent complementary pairs. In this example, the second pitch 160 is 7/6, i.e. 1 1/6, times the first pitch 155. As with the example illustrated in FIGS. 4 and 5, the photodiode detector array 150 satisfies the equation:

second pitch=first pitch*((3+4$i$)/(2+4$i$)), where i is an integer greater than or equal to 0. It is noted that the present example satisfies the foregoing equation with i=1. Like photodiodes are connected in series in output arrangement 151.

In the example array 150 illustrated in FIG. 6, each complementary photodiode repeats with a pitch that alternates between 5 1/3 times the first pitch 155 and 3 1/3 times the first pitch 155. For example, photodiode 7A repeats with a pitch that alternates between a first distance 161 that is 5 1/3 times the first pitch 155 and a second distance 162 that is 3 1/3 times the first pitch 155.

Figure 7:
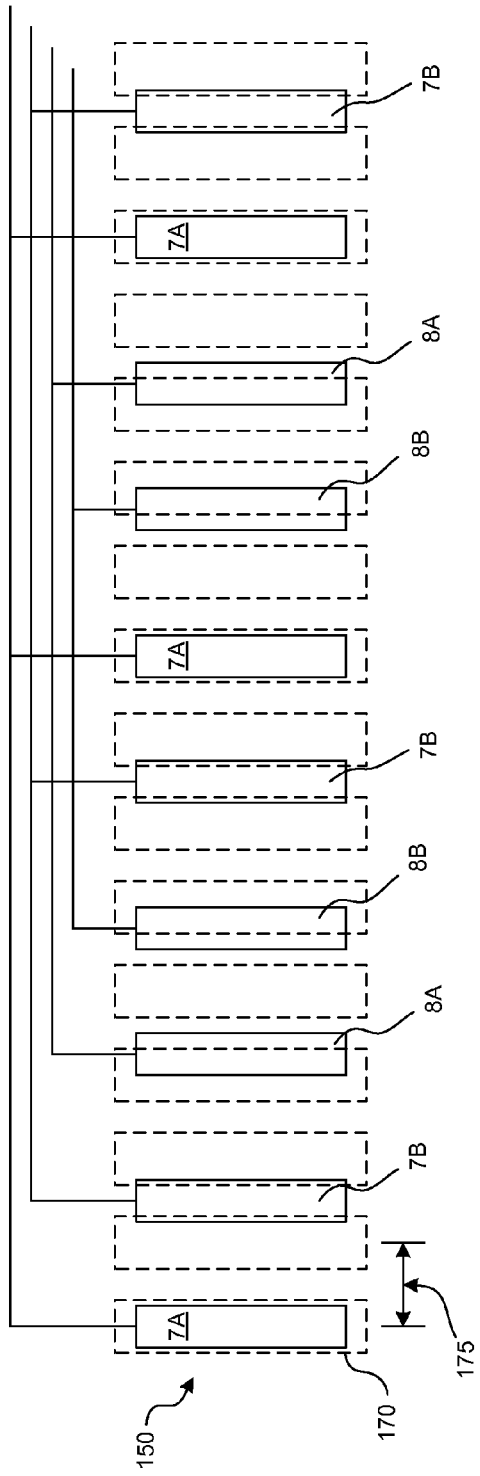
FIG. 7 is a top view of the photodiode detector array illustrated in FIG. 6, further illustrating the positions of slots of a scale index member.

FIG. 7 is a top view of the photodiode detector array 150 illustrated in FIG. 6 further illustrating the positions of slots 170 of a scale index member, e.g., a code disk. These slots 170 direct light from a light source to the photodiodes 7A, 7B, 8A, 8B. The slots 170 are positioned according to a slot pitch 175, which, in this example, is 2/3 times the first pitch 155. When the slots 170 are in the position indicated in FIG. 7, each photodiode 5A is fully exposed by the slots 170 to light from the light source, while photodiode 5B is substantially unexposed and photodiodes 6A and 6B are each approximately half exposed. The slots exposing photodiodes 7A are alternatingly spaced by distances equal to eight and five times the slot pitch 175.

FIG. 8 is a top view of a photodiode detector array 200 according to an exemplary embodiment of the present invention. The photodiode detector array 200 includes a pattern of repeating segments of eight photodiodes, each segment having the following pattern: 17A, 19A, 19B, 17A, 17B, 19B, 19A, 17B. Within each segment, four non-complementary pairs of photodiodes, e.g., 17A-19A, 19B-17A, 17B-19B, and 19A-17B, each have a first pitch 205 and a gap 215 between non-complements, and a second pitch 210 between adjacent non-complementary pairs. In this example, the second pitch 210 is 1.2 times the first pitch 205. It should be appreciated, however, that any combination of pitches may be employed, such as according to the following equation:

second pitch=first pitch*((2+4$i$)/(1+4$i$)), where i is an integer greater than or equal to 0. It is noted that the present example satisfies the foregoing equation with i=1. Like photodiodes are connected in series in output arrangement 201.

In the example array 200 illustrated in FIG. 8, each complementary photodiode repeats with a pitch that alternates between 3.2 times the first pitch 205 and 5.6 times the first pitch 205. For example, photodiode 17A repeats with a pitch that alternates between a first distance 211 that is 3.2 times the first pitch 205 and a second distance 212 that is 5.6 times the first pitch 205.

FIG. 9 is a top view of the photodiode detector array 200 illustrated in FIG. 8 further illustrating the positions of slots 220 of a scale index member, e.g., a code disk. These slots 220 direct light from a light source to the photodiodes 17A, 17B, 19A, 19B. The slots 220 are positioned according to a slot pitch 225, which, in this example, is 4/5, or 0.8 times, the first pitch 205. When the slots 220 are in the position indicated in FIG. 9, each photodiode 17A is fully exposed by the slots 220 to light from the light source, while photodiodes 17B are substantially unexposed and photodiodes 19A and 19B are each approximately half exposed. The slots exposing photodiodes 17A are alternatingly spaced by distances equal to four and seven times the slot pitch 225.

Although the examples illustrated in FIGS. 4 to 9 are illustrated as being arranged linearly, it should be appreciated that the photodiode detector arrays 100, 150, 200 and the slots 120, 170, 220 may be disposed in a nonlinear arrangement, e.g., along a circumference or an arc. It should be further appreciated that the slots 120, 170, 220 may be, e.g., openings, reflectors, or any other configuration that allows for the effective direction of light from a light source to the photodiode detector arrays 100, 150, 200.

Figure 10:
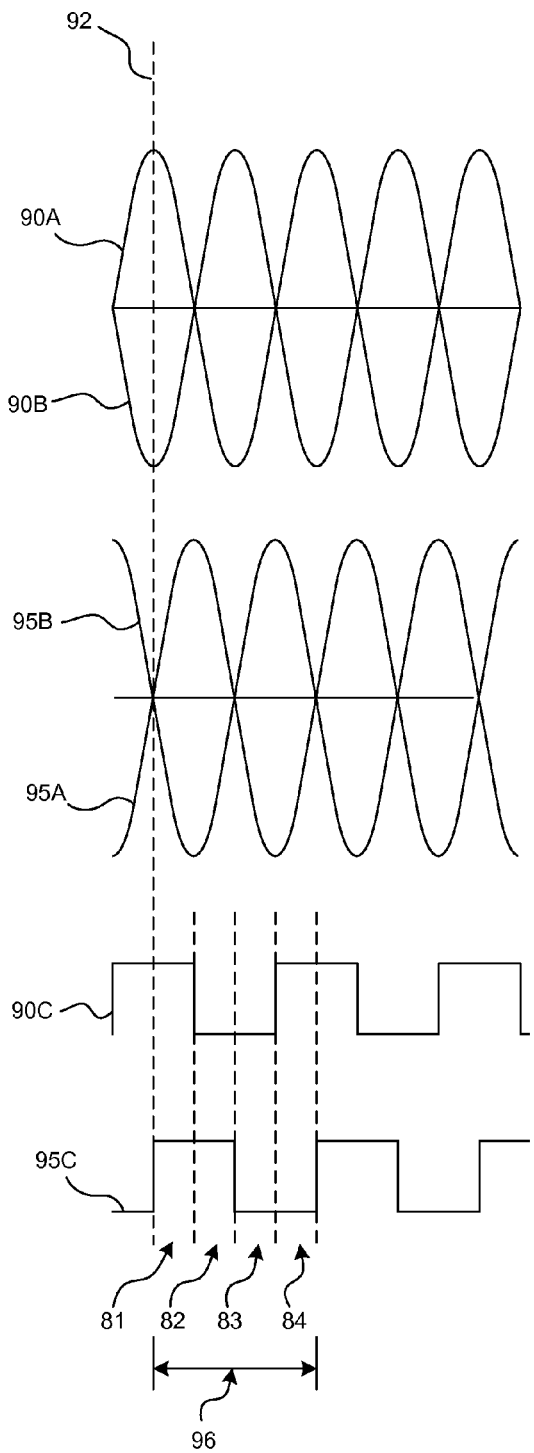
FIG. 10 is a graphical view of analog and digitized output signals associated with the photodiode detector arrays of FIGS. 4 to 9.

The positions of the slots as illustrated in the embodiments of FIGS. 5, 7, and 9 cause the photodiodes to generate output signals as generally illustrated in FIG. 10 at line 92. Signal 90A, which represents the output signal from photodiodes 5A, photodiodes 7A, or photodiodes 17A is approximately at a maximum value, and signal 30B, which is the output signal from photodiodes 5B, photodiodes 7B, or photodiodes 17B is approximately at a minimum value. Signals 95A and 95B, which are the output signals from photodiodes 6A and 6B, respectively, photodiodes 8A and 8B, respectively, or photodiodes 19A and 19B, respectively, are each approximately at a value halfway between a maximum value and a minimum value. These analog signals 90A, 90B, 95A, 95B are converted to digital channels 90C and 95C. Channel 90C is at a high value when the value of signal 90A exceeds the value of signal 90B and at a low value when the value of signal 90B exceeds the value of signal 90A; and channel 95C is at a high value when the value of signal 95A exceeds the value of signal 95B and at a low value when the value of signal 95B exceeds the value of signal 95A. As the slots 120, 170, 220 are displaced in relation to the photodiode detector arrays 100, 150, 200 by a distance equal to the slot pitches 125, 175, 225, four discrete position signal combinations 81, 82, 83, 84 are successively generated. These combinations are: (a) channel 90C high/channel 95C high; (b) channel 90C low/channel 95C high; (c) channel 90C low/channel 95C low; and (d) channel 90C high/channel 95C low. Four adjacent combinations span a distance 96, which, in these examples, corresponds to the slot pitches 125, 175, 225 of the slots 120, 170, 220. It may be provided for each of the position signal combinations to occupy a substantially equal range of displacement.

Figure 11:
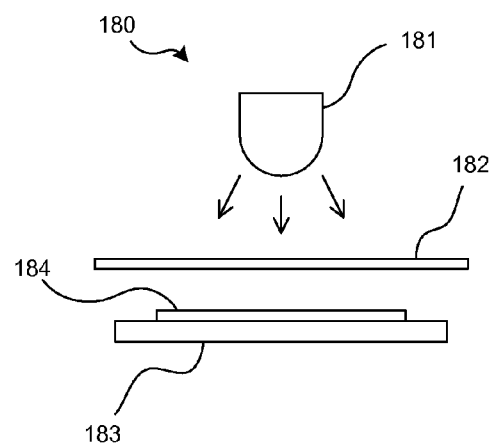
FIG. 11 is a side view of a portion of an encoder system.

FIG. 11 is a side view of a portion 180 of an encoder system, including a light source 181, a slotted scale index member 182, a substrate 183, and a photodiode detector array 184 arranged on the substrate 183. As the slotted scale index member 182 is displaced with respect to the photodiode detector array 184 and the light source 181, the slotted scale index member 182 directs light from the light source 181 to the photodiode detector array 184 though slots disposed in the slotted scale index member 182.

It should be appreciated that other combinations of first pitch and second pitch may be used according to the foregoing equations by, e.g., adjusting the integer value of i. For example, the second diode pitch may be (a) twice the first diode pitch, (b) 1 1/5 the first diode pitch, or (c) 1 1/10 the first diode pitch.

It should be appreciated that certain combinations of first pitch, second pitch and code disk pitch provide for very high virtual resolution. For example, a six-fold increase in resolution (e.g., a 6× virtual resolution) may be attained by providing adjacent photodiodes at a first pitch of 1.5 times the code disk pitch and at a second pitch at 1.75 times the code disk pitch; and a five-fold increase in resolution (e.g., a 5× virtual resolution) may be attained by providing adjacent photodiodes at a first pitch of 1.25 times the code disk pitch and at a second pitch of 1.5 times the code disk pitch. Thus, for example, for a code disk pitch of 6.4 μm, a virtual diode pitch of 1.6 μm may be attained even though the photodiodes are arranged at a first pitch of 9.6 μm and at a second pitch of 11.2 μm (i.e., a 6× virtual resolution); and, for a code disk pitch of 7.2 μm, a virtual diode pitch of 1.8 μm may be attained even though the photodiodes are arranged at a first pitch of 9.0 μm and at a second pitch of 10.8 μm (i.e., a 5× virtual resolution).

What is claimed is:

1. A photodiode detector array for an optical encoder, comprising:
a sequence of photodiodes having a pitch distance between adjacent photodiodes that alternates between a first pitch distance and a second pitch distance, the second pitch distance being different than the first pitch distance.

2. The photodiode detector array according to claim 1, wherein the following equation is satisfied:

second pitch distance=first pitch distance*$((3+4i)/(2+4i))$, representing an integer greater than or equal to 0.

3. The photodiode detector array according to claim 1, wherein the second pitch distance is 1.5 times the first pitch distance.

4. The photodiode detector array according to claim 1, wherein the following equation is satisfied:

second pitch distance=first pitch distance*$((2+4i)/(1+4i))$, representing an integer greater than or equal to 0.

5. The photodiode detector array according to claim 1, wherein the second pitch distance is 1.2 times the first pitch distance.

6. The photodiode detector array according to claim 1, wherein the photodiode array has a plurality of channels, each channel including a first complementary photodiode and a second complementary photodiode.

7. The photodiode detector array according to claim 6, wherein each of the first complementary photodiode and the second complementary diode repeats with a third pitch distance, the third pitch distance one of (a) alternating between 4 times the first pitch distance and 6 times the first pitch distance and (b) alternating between 5⅓ times the first pitch distance and 3⅓ times the first pitch distance.

8. The photodiode detector array according to claim 6, wherein each of the first complementary photodiode and the second complementary photodiode repeats with a third pitch distance, the third pitch distance alternating between 5.6 times the first pitch distance and 3.2 times the first pitch distance.

9. The photodiode detector array according to claim 1, wherein the pitch distance between adjacent photodiodes repeatedly alternates between the first pitch distance and the second pitch distance.

10. An optical encoder, comprising:
a light source;
a photodiode detector array including a sequence of photodiodes having a pitch distance between adjacent photodiodes that alternates between a first pitch distance and a second pitch distance, the second pitch distance being greater than the first pitch distance; and
a scale index member configured to direct light from the light source to the photodiodes.

11. The optical encoder according to claim 10, wherein the scale index member is a code disk.

12. The optical encoder according to claim 10, wherein the scale index member includes slots having a slot pitch distance, the slot pitch being twice the first pitch distance.

13. The optical encoder according to claim 10, wherein the scale index member includes slots having a slot pitch distance, the slot pitch distance being ⅘ the first pitch distance.

14. The optical encoder according to claim 10, wherein the photodiode array has a plurality of channels, each channel including a first complementary photodiode and a second complementary photodiode.

15. The optical encoder according to claim 10, wherein the pitch distance between adjacent photodiodes repeatedly alternates between the first pitch distance and the second pitch distance.

16. An optical encoder, comprising:
a light source;
a photodiode detector array including a sequence of photodiodes having a pitch between adjacent photodiodes that alternates between a first pitch and a second pitch, the second pitch being greater than the first pitch; and
a scale index member configured to direct light from the light source to the photodiodes;
wherein at least one of the following equations is satisfied:

second pitch=first pitch*$((3+4i)/(2+4i))$; and    (a)

second pitch=first pitch*$((2+4i)/(1+4i))$;    (b)

i representing an integer greater than or equal to 0.

17. The optical encoder according to claim 10, wherein the second pitch distance is one of (a) 1.5 times the first pitch distance, (b) alternating between 5⅓ times the first pitch distance and 3⅓ times the first pitch distance, and (c) 1.2 times the first pitch distance.

18. The optical encoder according to claim 16, wherein the scale index member is a code disk.

19. The optical encoder according to claim 16, wherein the scale index member includes slots having a slot pitch, the slot pitch being twice the first pitch.

20. The optical encoder according to claim 16, wherein the scale index member includes slots having a slot pitch, the slot pitch being ⅘ the first pitch.

21. The optical encoder according to claim 16, wherein the second pitch is one of (a) 1.5 times the first pitch, (b) alternating between 5⅓ times the first pitch and 3⅓ times the first pitch, and (c) 1.2 times the first pitch.

22. The optical encoder according to claim 16, wherein the photodiode array has a plurality of channels, each channel including a first complementary photodiode and a second complementary photodiode.

23. The optical encoder according to claim 16, wherein each of the first complementary photodiode and the second complementary diode repeats with a third pitch, the third pitch one of (a) alternating between 4 times the first pitch and 6 times the first pitch and (b) alternating between 5.4 times the first pitch and 3.4 times the first pitch.

24. The optical encoder according to claim 16, wherein the pitch between adjacent photodiodes repeatedly alternates between the first pitch and the second pitch.

25. An optical encoder, comprising:

a light source;

a photodiode detector array including a sequence of photodiodes having a pitch between adjacent photodiodes that alternates between a first pitch and a second pitch, the second pitch being greater than the first pitch; and a scale index member configured to direct light from the light source to the photodiodes;

wherein each of the first complementary photodiode and the second complementary diode repeats with a third pitch, the third pitch one of (a) alternating between 4 times the first pitch and 6 times the first pitch and (b) alternating between 5.4 times the first pitch and 3.4 times the first pitch.

26. The optical encoder according to claim 25, wherein the scale index member is a code disk.

27. The optical encoder according to claim 25, wherein the scale index member includes slots having a slot pitch, the slot pitch being twice the first pitch.

28. The optical encoder according to claim 25, wherein the scale index member includes slots having a slot pitch, the slot pitch being $4/5$ the first pitch.

29. The optical encoder according to claim 25, wherein the second pitch is one of (a) 1.5 times the first pitch, (b) alternating between $5\frac{1}{3}$ times the first pitch and $3\frac{1}{3}$ times the first pitch, and (c) 1.2 times the first pitch.

30. The optical encoder according to claim 25, wherein the photodiode array has a plurality of channels, each channel including a first complementary photodiode and a second complementary photodiode.

31. The optical encoder according to claim 25, wherein the pitch between adjacent photodiodes repeatedly alternates between the first pitch and the second pitch.

\* \* \* \* \*